Patented July 27, 1948

2,446,124

UNITED STATES PATENT OFFICE 2,446,124

REACTION OF HYDROGEN HALIDES WITH COMPOUNDS HAVING ALIPHATIC UNSATURATION

Thomas Boyd, Springfield, Mass., assignor to Monsanto Chemical Company, St. Louis, Mo., a corporation of Delaware No Drawing. Application June 21, 1944, Serial No. 541,458

10 Claims. (Cl. 260—656)

This invention relates to the vapor phase reaction between hydrogen halides and compounds having aliphatic unsaturation. More particularly, this invention relates to the vapor phase reaction of hydrogen halides with acetylene to form vinyl halides.

It is an object of this invention to provide a new process for reacting hydrogen halides with compounds having aliphatic unsaturation. Another object of this invention is to provide a new process for reacting hydrogen halides with compounds containing an acetylenic linkage. A particular object is to provide a new and improved process for preparing vinyl halides from hydrogen halides and acetylene.

These and other objects are accomplished according to this invention by reacting hydrogen halides in the vapor phase with compounds having aliphatic unsaturation, in the presence of a solid catalyst comprising a mercuric halide and a cerium halide. More particularly, it has been found that vinyl halides may be obtained in high yields by vapor phase reaction between hydrogen halides and acetylene in the presence of a solid complex salt of a mercuric halide and a cerium halide.

The following examples are illustrative of the process of this invention, but are not limitative thereof.

Example I 12.2 grams of cerous chloride and 53.8 grams of mercuric chloride are dissolved in 170 cc. of distilled water acidified with about 4 cc. of concentrated hydrochloric acid. The resulting solution is added to 200 grams of activated charcoal previously dehydrated at 400° C. and at an absolute pressure corresponding to 5 mm. of mercury. The resulting mixture is dried at 110° C. for 8 hours at 50 mm. absolute pressure and then at 175-200° C. for 24 hours at 5 mm. absolute pressure. An iron pipe, about one-half inch in inside diameter and six feet in length is filled with the dried product which comprises a complex salt of mercuric chloride and cerous chloride deposited on activated charcoal, and then heated in a circulating oil bath maintained at 100° C. An anhydrous mixture of equimolecular amounts of acetylene and anhydrous hydrogen chloride gas are passed through the foregoing heated tube at the rate of 600 cc. per minute for each gas, together with from 0.5 to 2 cc. per minute of chlorine gas.

Analysis of the effluent gases shows that the percentage conversion of acetylene to vinyl chloride is initially substantially 100%, and even after 300 hours of operation is still about 98.5%. It is noted that there is no evidence of reduction of mercuric chloride to mercury or sublimation of mercuric chloride during the reaction. The vinylchloride obtained as described above may be suitably purified, for example by fractional distillation.

Example II

Example I is repeated except that cerous chloride, mercuric chloride and hydrogen chloride are replaced by equivalent amounts of the corresponding bromides and chlorine gas is replaced by bromine gas. Vinyl bromide is hereby obtained in high yield.

Example III

Example I is repeated except that acetylene is replaced by ethylene. A high yield of ethyl chloride is thereby obtained.

Numerous variations may be introduced into the process of this invention as exemplified by the examples. Thus, while a small amount of free halogen may be included with the reacting gases, e. g. 0.01-3% of the reactants by volume, the process may be operated for long periods of time without the addition of free halogen, while at the same time obtaining high yields of the halide products. In place of a reaction tube made from iron, other reaction tubes or chambers may be employed, as for example, tubes made from ferrous materials generally, glazed porcelain, glass and the like. The relative proportions of unsaturated compound and hydrogen halide may be substantially varied. For example, the use of an excess of hydrogen halide, such as 5-15% excess serves to reduce the amount of unconverted unsaturated compound to mere traces. However, when desirable an excess of the unsaturated compound may be used, for example, up to a three or four-fold excess.

It may be desirable, under certain conditions, to employ a reaction tube in which is placed a graduated amount of the catalyst, so that the reacting gases as they pass through the reactor, come in contact with an increasing concentration of the catalyst salts. This may be accomplished by employing a reactor in which the amount of the catalyst salts gradually increases from the inlet to the outlet, or by employing a series of tubes or other reactors in which the concentration of catalyst is uniform within a single reactor, but in which the reactors progressively along the line of vapor travel contain increasing concentrations of catalyst.

In carrying out the reaction according to the process of this invention, the mercuric halide-cerium halide catalyst is advantageously deposited on a porous carrier, particularly one having high surface activity. Examples of such carriers are silica gel, activated charcoal, activated alumina, asbestos, diatomaceous earth and the like.

The temperature at which the reaction tube is maintained may be varied substantially from that employed in the examples. Thus temperatures ranging from 50–250° C. may be used. Generally, temperatures in the range 80–150° C. are preferred. Temperatures in the lower portions of the ranges given above are advantageously employed, particularly when the reaction tubes have a relatively large diameter, for example, one inch or over.

When desired, instead of depositing the complex salt on a carrier by evaporation, the salt may be deposited on the carrier by adsorption. This may be accomplished by dissolving the components of the complex in the proper proportions in water that is preferably acidified with hydrochloric acid, adding a suitable amount of a carrier such as dehydrated activated charcoal, allowing the mixture to reach equilibrium, filtering and finally drying the solid product. For example, the components of the complex in the proportions set forth in Example I may be dissolved in about 300 cc. of water that is acidified with about 1.5 cc. of concentrated hydrochloric acid and thereafter 150 grams of dehydrated activated charcoal added. The resulting mixture is then allowed to stand for 15–24 hours to allow the adsorption equilibrium to be attained, filtered and the solid product dried at 110° C. for 10 hours, following by 24 hours at 175–200° C. and 5 mm. absolute pressure.

Another method of preparing the mercuric halide-cerium halide comprises depositing cerium halide on a carrier such as activated charcoal, then passing mercury vapors through the charcoal until it is saturated therewith and thereafter passing halogen gas through the treated charcoal at an elevated temperature, for example, 100–200° C. to convert the mercury to mercuric halide, thereby forming a complex salt of cerium halide and mercuric halide, in situ.

Other methods of preparing the mercuric chloride-cerium chloride catalyst may be used, for example, mechanically admixing the two materials, preferably while in a finely powdered condition. Catalysts prepared in this manner may be dusted on a carrier such as activated charcoal.

Instead of employing the mercuric halide and cerium halide in the proportions giving a double salt, for example, the complex salt $CeCl_3.4HgCl_2$ employed in Example I, an excess of either cerium halide or mercuric halide may be present. For example, the excess of cerium halide or mercuric halide may equal three or four or more times the amount present in the complex salt. Thus, according to one embodiment of this invention, the cerium halide-mercuric halide catalyst may contain from 0.1–5% mercuric halide and 99.9–95% cerium halide.

In addition to mercuric halides and cerium halides, there may be included one or more halides of other metals, as for example, halides of alkali metals such as potassium and sodium and halides of alkaline earth metals, such as calcium, strontium, barium and the like. Thus, these additional metal halides may be deposited on a carrier simultaneously with the cerium and mercuric halide or otherwise mixed with the cerium halide-mercuric halide catalyst.

In place of cerium halides, halides of other metals having an atomic weight of more than 55 and having more than one state of oxidation, may be employed in conjunction with mercuric halides. Examples of such metal halides are the halides of manganese, iron, gallium, ruthenium, palladium, tin, alabamine, osmium, iridium, platinum, thallium, uranium and europium.

In place of hydrogen chloride, other hydrogen halides may be employed, such as hydrogen bromide, hydrogen iodide, and hydrogen fluoride. Preferably, the halogen in the hydrogen halide, in the halide salts and, any free halogen introduced with the reactants, is the same.

Included within the scope of this invention are compounds having aliphatic unsaturation, other than acetylene. As examples of such compounds may be mentioned aliphatic compounds containing one or more olefinic or acetylenic linkages. These may be hydrocarbons or halo-substituted unsaturated aliphatic compounds, especially when the unsaturated groups are removed from the halogen substituents. Examples of such compounds are primary, secondary and tertiary olefines such as propene, butene-1, butene-2, 2-methyl-propene, pentenes, hexenes, heptenes, octenes, monenes; halo-substituted normal and branched chain olefines such as dichlorpropene-1, dibrompropene-1, 2-chloroprene-1, 1-chlorobutene-1, 1,1-dichlorobutene-2, 1-chloro-3-methylene butene and the like, their homologues and analogues; cyclic olefines and halo-substitution products thereof such as cyclo-butene, cyclopentene, cyclohexene; unsaturated compounds containing acetylenic linkages, such as pentyne-2, hexyne-1, cetyne-2, octyl acetylene; the foregoing types of unsaturated aliphatic compounds linked to cyclo-alkyl and/or aromatic radicals such as 1-phenyl propene-2, 1-phenyl-chloro-butene-2, phenyl acetylene, vinyl pyridine; unsaturated compounds containing more than one unsaturated group such as butadiene, heptadiene, cycloheptadiene; unsaturated aliphatic compounds containing substituents other than those given above, for example, methyl acrylate, divinyl ether, diallyl ether and dimethyllyl ether.

It is to be understood that the rate of flow of the gas mixture is not limited to that given in the examples. The particular rate of flow employed is correlated with such factors as the reaction temperature, size of the reaction chamber, etc., and may vary widely.

It is to be understood that the above description is given by way of illustration only and not of limitation, and that deviations are possible within the spirit of the invention.

What is claimed is:

1. A process which comprises reacting in the vapor phase a hydrogen halide with a compound having aliphatic unsaturation, in the presence of a solid complex salt of a mercuric halide and a cerium halide.

2. A process which comprises reacting in the vapor phase a hydrogen halide with an unsaturated aliphatic compound containing an acetylenic linkage, in the presence of a solid complex salt of a mercuric halide and a cerium halide.

3. A process which comprises reacting in the vapor phase hydrogen chloride with an unsaturated aliphatic compound containing an acetylenic linkage, in the presence of a solid complex salt of mercuric chloride and cerium chloride.

4. A process for making a vinyl halide which comprises reacting in the vapor phase a hydrogen halide with acetylene, in the presence of a solid complex salt of a mercuric halide and a cerium halide.

5. A process for preparing vinyl bromide which comprises reacting in the vapor phase hydrogen bromide with acetylene, in the presence of a solid complex salt of mercuric bromide and cerium bromide.

6. A process for preparing vinyl bromide which comprises reacting in the vapor phase hydrogen bromide with acetylene, in the presence of a solid complex salt of mercuric bromide and cerium bromide.

7. A process as defined in claim 6 in which a small amount of bromine is also present during the reaction.

8. A process as defined in claim 6 in which the complex salt is deposited on a porous material of high surface activity.

9. A process as defined in claim 6 in which the complex salt is deposited on activated charcoal.

10. A process for preparing vinyl bromide which comprises reacting in the vapor phase hydrogen bromide with acetylene in the presence of a solid catalyst consisting of a complex salt of mercuric bromide and cerium bromide.

THOMAS BOYD.

REFERENCES CITED

The following references are of record in the file of this patent:

UNITED STATES PATENTS

| Number | Name | Date |
|---|---|---|
| 1,063,007 | Mittasch | May 27, 1913 |
| 1,445,168 | Plauson | Feb. 13, 1923 |
| 1,919,886 | Herrman et al. | July 25, 1933 |
| 1,926,638 | Toussaint | Sept. 12, 1933 |
| 2,183,240 | Jung | Dec. 12, 1939 |
| 2,265,286 | Japs | Dec. 9, 1941 |

FOREIGN PATENTS

| Number | Country | Date |
|---|---|---|
| 99,521 | Switzerland | June 1, 1923 |